(12) United States Patent
Foster et al.

(10) Patent No.: US 7,080,357 B2
(45) Date of Patent: Jul. 18, 2006

(54) SOFTWARE PACKAGE VERIFICATION

(75) Inventors: Tim Scott Foster, Dublin (IE); Louise Christine Lahiff, Croom (IE)

(73) Assignee: Sun Microsystems, Inc., Santa Clara, CA (US)

( * ) Notice: Subject to any disclaimer, the term of this patent is extended or adjusted under 35 U.S.C. 154(b) by 765 days.

(21) Appl. No.: 09/776,328

(22) Filed: Feb. 2, 2001

(65) Prior Publication Data
US 2002/0059561 A1    May 16, 2002

(30) Foreign Application Priority Data
Jul. 7, 2000    (EP) .................................. 00305775

(51) Int. Cl.
*G06F 9/44*    (2006.01)
(52) U.S. Cl. .................... 717/126; 717/125; 707/101
(58) Field of Classification Search ........ 717/124–127, 717/168–178; 707/101
See application file for complete search history.

(56) References Cited

U.S. PATENT DOCUMENTS

| | | | |
|---|---|---|---|
| 5,905,856 A | 5/1999 | Ottensooser | 714/38 |
| 5,995,757 A | 11/1999 | Amberg et al. | 717/175 |
| 6,031,990 A | 2/2000 | Sivakumar et al. | 717/124 |
| 6,202,207 B1* | 3/2001 | Donohue | 717/173 |
| 6,346,951 B1* | 2/2002 | Mastronardi | 345/716 |
| 6,418,389 B1* | 7/2002 | Peter et al. | 702/108 |
| 6,560,776 B1* | 5/2003 | Breggin et al. | 717/176 |
| 6,601,018 B1* | 7/2003 | Logan | 702/186 |

* cited by examiner

*Primary Examiner*—Anil Khatri
*Assistant Examiner*—Lawrence Shrader
(74) *Attorney, Agent, or Firm*—Beyer Weaver & Thomas LLP

(57) ABSTRACT

A software package verification tool enables verifying a software package that includes at least one software component. The tool includes at least one test module defining a test of at least one parameter of a software component of the package. It also includes a control module operable to access a framework that identifies each test module and to cause at least one test module to perform the test defined thereby for verifying the package. The framework, within which individual test modules may be added or deleted as required, provides a flexible test structure for software packages. Typically, the framework identifies a plurality of test modules for verifying the correctness of a particular software package. In such a case, the framework can identify a priority for each test module for effecting an ordering of the tests. This enables the performance of the tests to be efficient, avoiding, for example, unnecessary tests that are redundant if the software package fails a more fundamental test.

42 Claims, 7 Drawing Sheets

SOFTWARE PACKAGE VERIFICATION TOOL

SOFTWARE PACKAGE
VERIFICATION TOOL

SOFTWARE PACKAGE VERIFICATION

BACKGROUND OF THE INVENTION

The invention relates to the checking of software packages with a view to improving software package quality.

As software installation packages become more and more complex, the task of verifying the structure and content of such packages becomes more and more difficult. A software installation package is a set of software components that are for delivery to a customer for installation on a computer system, the package being operable when it has been installed on the computer system. A software installation package could also be termed a software delivery package, but for reasons of conciseness is referred to hereinafter as a software package.

A software package as supplied, for example, on a medium such as disk, or over a network can involve many program and data components (hereinafter software components), such as data files, program files, program modules, etc. Typically, the process of verifying that the software components are valid in themselves, are consistent with each other, and are consistent with a target platform or system has involved manual checking of those components by the members of a development team and/or an associated quality control group.

There are individual tools that can provide isolated checks on a software package. For example, a program called "pkgchk", available on the Solaris operating system platform (Solaris is a Trademark of Sun Microsystems, Inc.), is able to provide a check of package structure integrity. However, even with such tools, manual coordination of tests to be performed is required, which is expensive, time consuming, and prone to human error.

An aim of the invention is, therefore, to enable more effective and reliable verification of software packages in a flexible manner.

SUMMARY OF THE INVENTION

Particular and preferred aspects of the invention are set out in the accompanying independent and dependent claims.

An aspect of the invention provides a software package verification tool for verifying a software package that includes at least one software component. The tool includes a framework operable to identify at least one test module defining a test of at least one parameter of a software component of the package. It also includes a control module operable to access the framework to cause at least one test module identified thereby to perform the test defined thereby for verifying the package.

By providing a framework within which individual test modules may be added or deleted as required, a flexible test structure can be provided for software packages.

Typically, the framework will identify a plurality of test modules for verifying the correctness of a particular software package. In such a case, the framework preferably identifies a priority for each test module, that is, it identifies the order in which tests are to be performed. This enables the ordering of the tests to be efficient, and would avoid taking time carrying out tests that might in any case be redundant if, for example, the software package failed a fundamental test.

Using the priority information, the control module can be operable sequentially to cause the test modules to be operable according to the test module priority identified in the framework.

A mechanism can be provided for identifying test modules that are active and test modules that are not active (i.e., which test modules are to be used for performing tests, and which are not to be used). This could, for example, be provided by means of the framework, or by means of the control module.

In one example of the invention, the framework comprises a directory having a plurality of entries, each entry identifying a test module. Each entry can define a priority of the test module identified thereby. Alternatively, or in addition, the identity (e.g. the file name) of a test module can define its priority. Each entry can also include an indicator as to whether the test module is to be active or not for a particular sequence of tests.

Examples of tests of software package parameters that may be performed by respective test modules are as follows:
a test of package structure integrity;
a test that all components are compiled using a compatible compiler version;
a test that all binaries are for the same architecture;
a test that a copyright module is current;
a test that only specified modules are present;
a test of changes with respect to a previous version of the package.

An embodiment of the invention also includes at least one test module. Each test module can be formed by a script and the framework can identify a test module by a name for the script for that module. Each test module could alternatively be formed by software objects.

In another embodiment of the present invention, the software package verification tool can be in the form of a computer program, for example in the form of computer program instructions provided on a carrier medium. The carrier medium could, for example, be a storage or a transmission medium.

Another aspect of the invention provides a system for verifying a software package that includes at least one software component. The system includes a framework operable to identify at least one test module defining a test of at least one parameter of a software component of the package and further includes a control module operable to access the framework for causing at least one test module to perform the test defined thereby for verifying the package.

The system can include a computer with a processor, memory and software held in the memory and operable to control the processor. The software can form a framework operable to identify at least one test module defining a test of at least one parameter of a software component of the package and can further form a control module. The control module can be operable to access the framework to cause at least one test module identified therein to perform the test defined thereby for verifying the package.

A further aspect of the invention provides a method of verifying a software package that includes at least one software component. The method includes providing a framework for identifying at least one test module, each said test module defining a test of at least one parameter of a software component of the package. It further includes accessing the framework to identify at least one test module and causing the test module to perform the test defined thereby on the package. The method can further include reporting test results.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF PARTICULAR EMBODIMENTS

Exemplary embodiments of the present invention are described below with reference to the accompanying drawings. An embodiment of the invention will be described that is implemented on a single computer workstation, by way of example only. However, the invention can equally be implemented on a host computer accessible by a terminal, on a multiple processor system or over a network comprising a plurality of computer stations. Also, as described later, the invention could be, for example, integrated into an integrated circuit.

Figure 1:
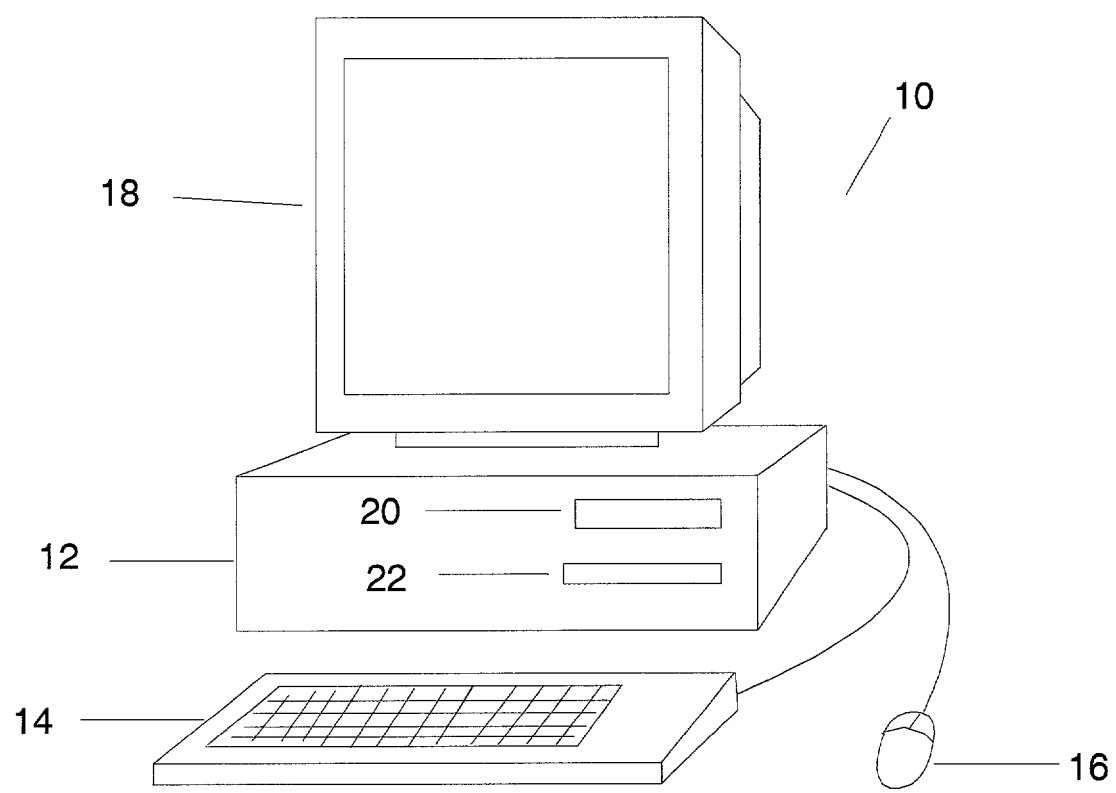
FIG. 1 is a schematic representation of a computer workstation upon which an exemplary embodiment of the invention may be practiced.

FIG. 1 is a schematic representation of a computer workstation on which an exemplary embodiment of the invention may be implemented. As shown in FIG. 1, a computer workstation 10 includes a system unit 12 that includes a processor, memory, etc. (see FIG. 2), user input devices, for example in the form of a keyboard 14 and a mouse 16, and a display 18. Removable media devices in the form, for example, of a floppy disk drive 20 and an optical and/or magneto-optical drive (e.g. a CD, a DVD ROM, a CDR drive) 22 can also be provided.

Figure 2:
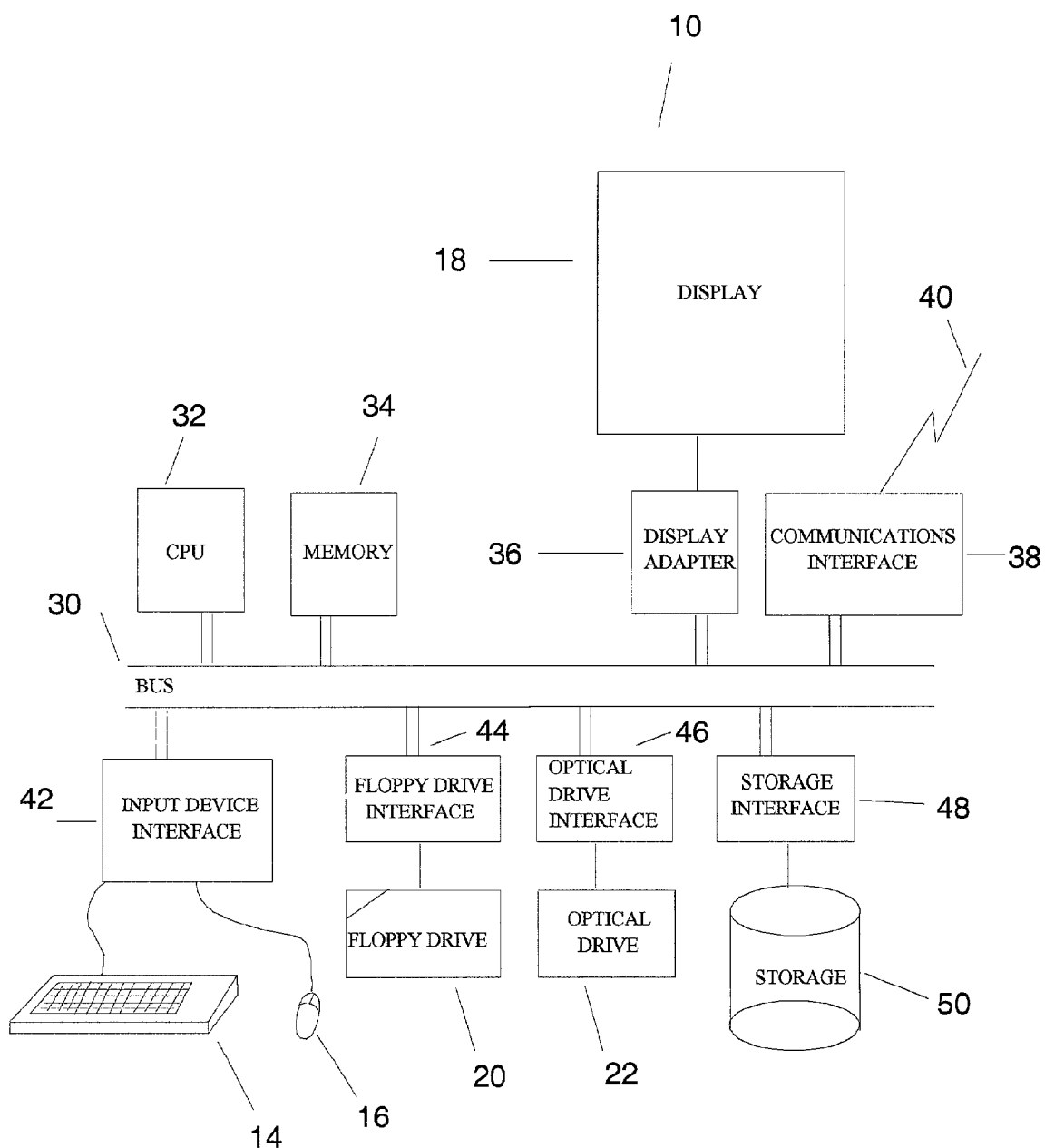
FIG. 2 is schematic block diagram illustrating an exemplary configuration of a computer workstation as shown in FIG. 1.

FIG. 2 is schematic block diagram illustrating an exemplary configuration of a computer workstation 10 as shown in FIG. 1.

As shown in FIG. 2, the computer workstation 10 includes a bus 30 to which a number of units are connected. A microprocessor (CPU) 32 is connected to the bus 30. Main memory 34 for holding computer programs and data is also connected to the bus 30 and is accessible to the processor. A display adapter 36 connects the display 18 to the bus 30. A communications interface 38, for example a network interface and/or a telephonic interface such as a modem, ISDN or optical interface, enables the computer workstation 10 to be connected 40 to other computers via, for example, an intranet or the Internet (not shown). An input device interface 42 connects one or more input devices, for example the keyboard 14 and the mouse 16, to the bus 30. A floppy drive interface 44 provides access to the floppy disk drive 20. An optical drive interface 46 provides access to the optical or magneto-optical drive 22. A storage interface 48 enables access to a hard disk 50. Further interfaces, not shown, for example for connection of a printer (not shown), may also be provided. Indeed, it will be appreciated that one or more of the components illustrated in FIG. 2 may be omitted and/or additional components may be provided, as required for a particular implementation. Additionally, although aspects of the present invention are described as being stored in memory, one skilled in the art will appreciate that these aspects can also be stored on or read from other types of computer readable media, such as secondary storage devices, like hard disks, floppy disks, or CD-ROM; a carrier wave from a network, such as the Internet; or other forms of RAM or ROM either currently known or later developed.

Figure 3:
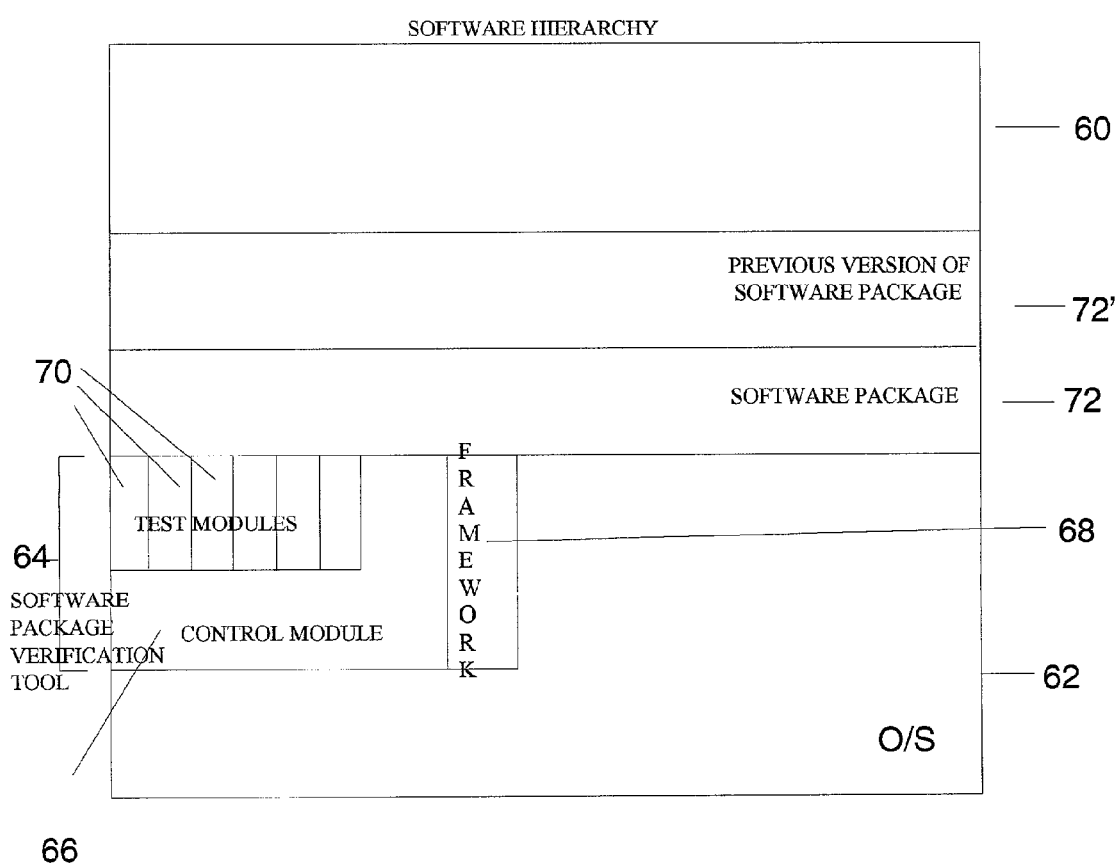
FIG. 3 is schematic representation of a software hierarchy of an exemplary embodiment of the invention.

FIG. 3 is a schematic representation of a software hierarchy of an exemplary embodiment of the present invention. The software hierarchy 60 illustrates the operating system (O/S) 62 of the computer workstation 10. A software package verification tool 64 includes a framework 68 that enables a control module 66 to access test modules 70 for testing the operation of a software package 72. Also shown in FIG. 3 is a previous version 72' of the software package 72.

Figure 4:
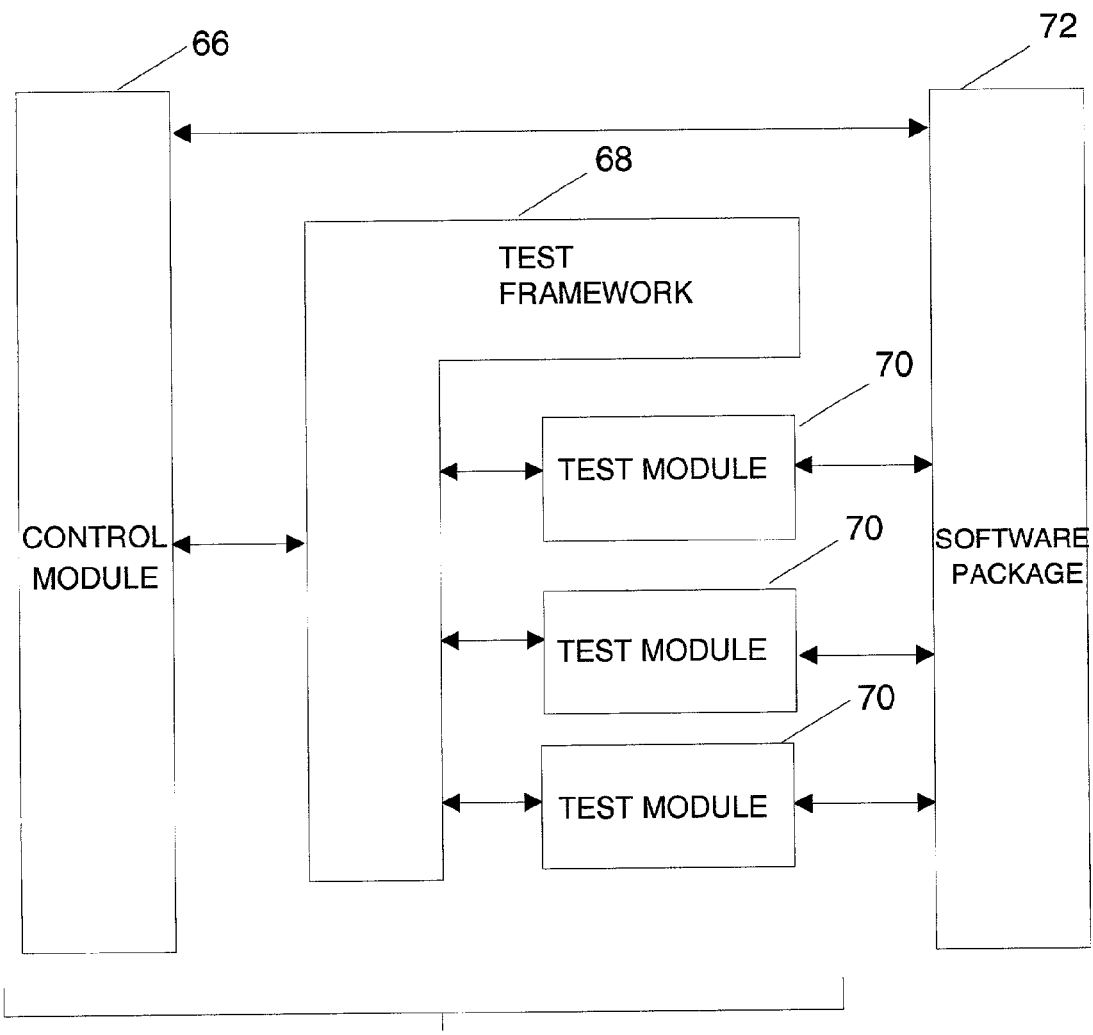
FIG. 4 further represents the relationship between some of the software hierarchy elements of an exemplary embodiment of the invention.

FIG. 4 illustrates the relationship of the various components of the verification tool 64. Thus, the control module 66 is operable to access the framework 68 that in turn provides access to the test modules 70. Each of the test modules 70 is a test routine that, on initialization, is registered with the framework 68, whereby the framework 68 is able to identify the test modules 70 for use in testing the software package 72. The registration can be effected using standard operating system techniques.

Figure 5:
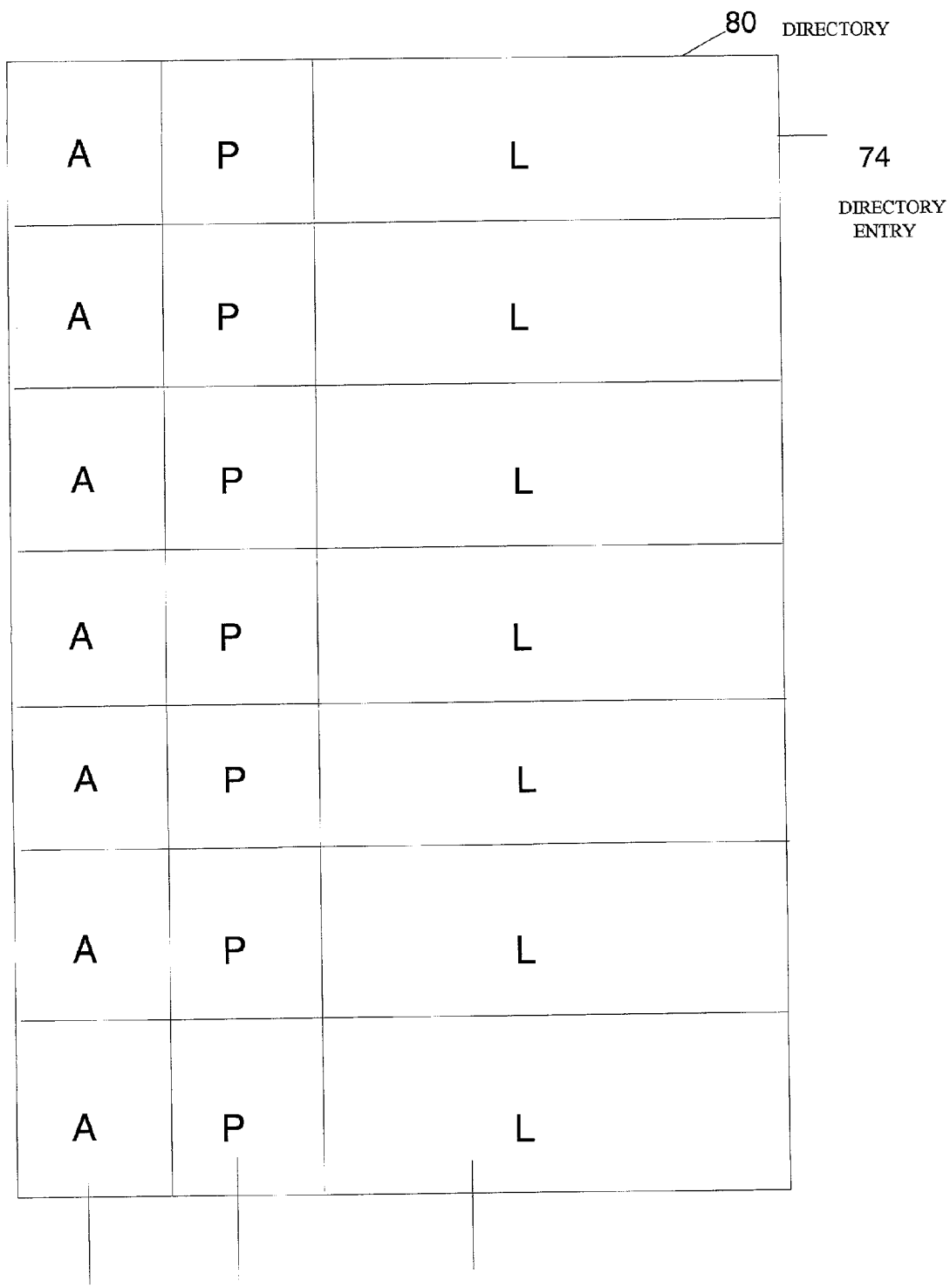
FIG. 5 illustrates a directory forming part of an exemplary embodiment of the invention.

As illustrated in FIG. 5, in one embodiment of the invention, the framework 68 (not shown) is operable to provide a directory 80 that includes a plurality of entries 74. Each entry 74 includes a link (L) 76 to a respective test module. In a particular example shown in FIG. 5, each entry 74 is also provided with a priority indictor (P) 78 indicating relative priorities of the test modules 70 identified by the respective links L 76. The priorities P indicate the order in which the various tests performed by the test modules are to be carried out.

Although in the particular example shown, a priority indication P is included in each entry 74 in the table, in other examples and embodiments the priority could be indicated in another manner. For example, the priority could be indicated by the link to the respective modules. For example, in an associative table, the link could be identified by the name, or label, applied to each of the modules, and this name could include a sequence number. Thus, for example, the test modules could have names such as TM0, TM1, TM2, etc. The priority order could be such that the lowest number indicates the highest priority, or alternatively that the highest number indicates the highest priority. As a further alternative, the directory 80 could be organized as a linked list, with the position in the list identifying the priority order. The use of separate test modules 70 that are registered with a framework 68, provides a flexible structure in that test modules can be added and/or deleted as required for any particular implementation. Also, particularly where the priority order is indicated by an entry in the directory, or by the organization of the directory (e.g., as a linked list), the order of the test can readily be changed.

FIG. 5 also illustrates a further field 75 for each of the entries 74. This further field contains an active indicator (A) 75 that indicates whether the test module relating to that entry is to be active or non-active for a particular sequence of tests. As an alternative to providing such an indication in the framework 68, the control module 66 could be coded to identify the modules to be active for a particular series of tests. The sequence of test modules to be active could depend, for example, on whether a software package to be verified is a new package, or whether it is a modified package and tests are to be performed comparing the current software package to a previous version of that package.

Figure 6:
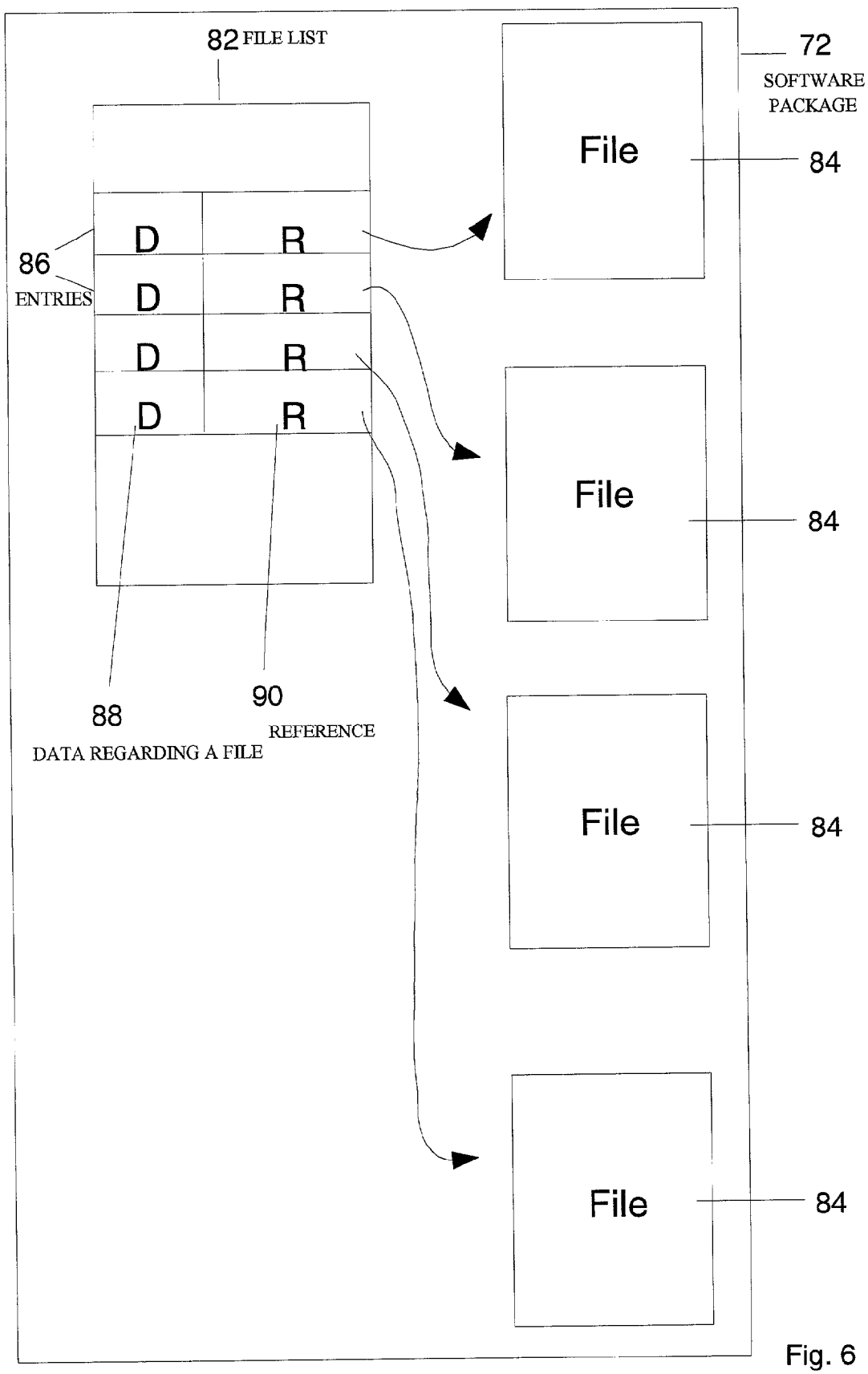
FIG. 6 is an exemplary schematic representation of a software package to be verified by an embodiment of a software package verification tool according to the invention.

FIG. 6 illustrates an exemplary software package, to be tested by a software verification tool in accordance with the present invention. The software package could be generated within the computer workstation 10 as a result of the work by a user of that station, or could be supplied on a removable medium such as a floppy disk or an optical, magnetic or magneto-optical disk, tape, etc., or could be supplied from a remote location via a network (e.g. intranet or internet). In one example of a package, for example as in a software package for the Solaris operating system environment, the package 72 includes a file list 82 which identifies a plurality of files 84 that make up the package. In the Solaris environment, this is known as the "pkgmap" (package map file). The manual implementing packaging utilities in accordance with the current Solaris standard (System 5, release 4 packaging standard) is available at http://docs.sun.com/ab2/coll.156.1/PACKINSTALL/. The file list 82 includes a plurality of entries 86. Each entry 86 relates to a respective file 84, and includes data (D) 88 about the file, and a reference (R) 90 to the file 84 concerned. The files 84 can be data and/or program files. The data D regarding those files can include parameters such as the file name, a version number, an operating system environment for which the package is intended, the size of the file, binary data types for the file, etc. It should be noted, however, that the invention is not limited to use with software packages of the type described above, or to software packages that include such a pkgmap file.

Various of the test modules 70 (e.g. See FIG. 4) can be operable to use the data D 88 corresponding to the files 84 of the software package 72 to verify the validity and/or correctness of the actual contents of the files 84 compared to the data D 88 corresponding thereto. In some cases, the test can be operable to provide an absolute test comparing the data D 88 to the content of the corresponding file 84 and/or to compare a current software package version to a previous software package version stored in the memory 34 of the computer workstation 10. For example, data regarding a prior version of a software package 72 could be stored as 72' in the file hierarchy 60 as shown in FIG. 3.

Figure 7:
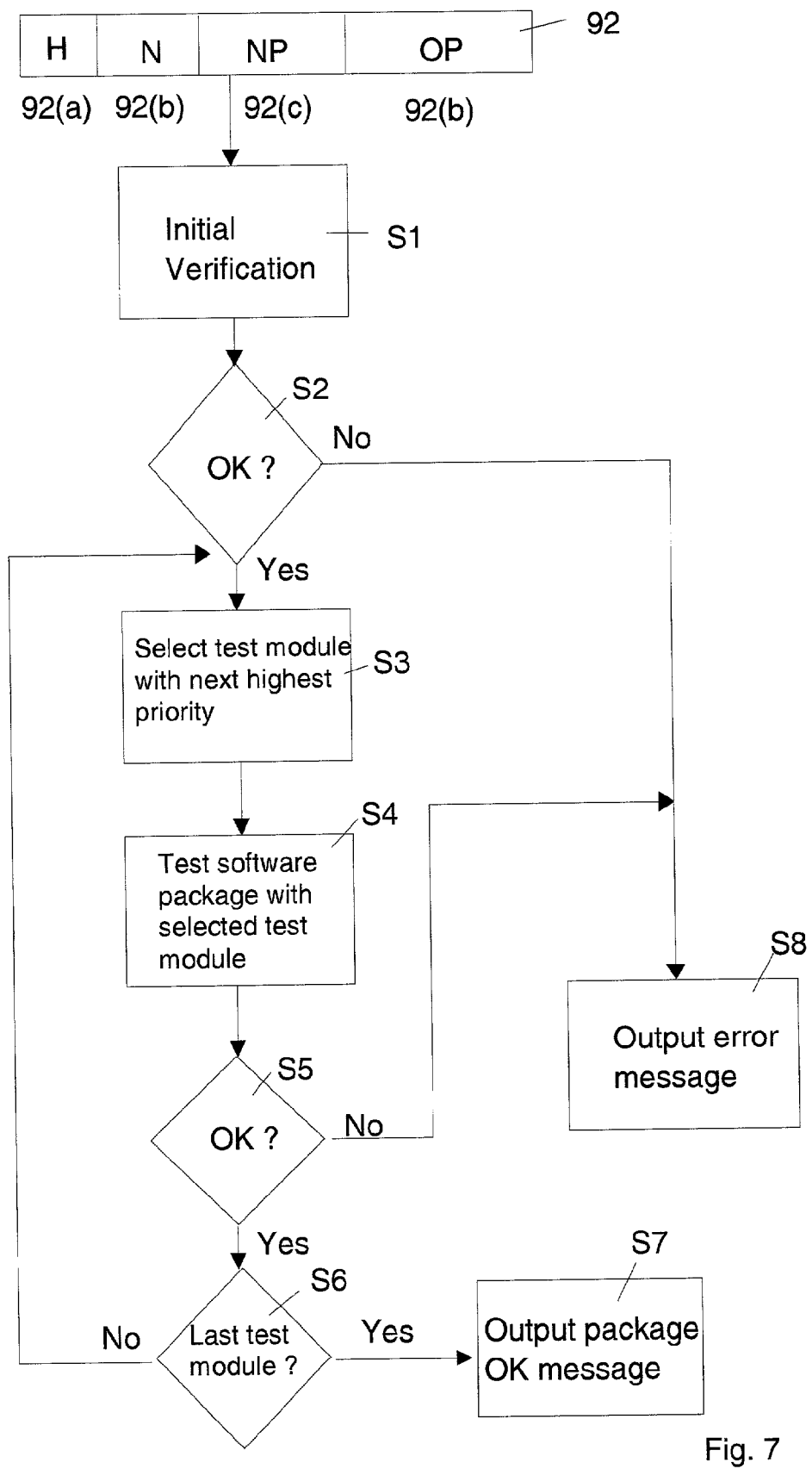
FIG. 7 is a flow diagram illustrating the operation of an exemplary embodiment of a software package verification tool according to the invention.

FIG. 7 is a flow diagram illustrating the operation of an embodiment of the invention. This flow diagram sets out the steps that are performed by the software verification tool in response to receipt of a command 92 for initiating the verification, or checking, of a software package.

On receipt of the command 92, the software package verification tool performs initial verification operations in step S1. The command 92 can include three or four arguments including an optional field H 92(a) for optionally hiding details, and indication N 92(b) as to whether the package is a new package, a new package name NP 92(c) including the path to that package, and where a new package is to be compared to an old package, the name of the old package OP 92(d) and the path to the old package. It is to be noted that this description of the command is merely exemplary, and that other formats are possible.

In the initial verification step S1, performed by control module 66 (See FIG. 4), a check is made to see that there are the correct number of arguments in the command 92 in order to initialize the checking operation. A check is also made to see that the package (or packages) exists in the directories identified in the paths to those packages. A further check is made to see that the user has permissions on the package(s) concerned, along with a check that the package contains actual files and not merely links that refer to a location that would not exist outside a software developer's environment. A check is also made to see if a package map (pkgmap) and package information (pkginfo) exist for the package(s) concerned. Pkginfo is the name for a file containing package information in a Solaris environment, including information such as an identification of the vendor, a version number, a release number, etc. In other environment, other components may be required instead or in addition to those just mentioned.

In each case, if one of these tests fails, in the in step S2 control passes to step S8 and an output error message of an appropriate type is issued. This can be displayed, for example, on the screen 18 of the computer workstation 10 or could be printed in an error log, or could be transmitted to a remote station.

If the initial verification tests in step S1 are positive, then control passes via step S2 to step S3.

In step S3, the test module with the next highest priority is selected (for this first time at step S3 the test module with the "next highest priority" is the test module with the highest priority). The priority is determined using the information in the directory 80, if a structure as shown in FIG. 5 is provided in the particular embodiment of the invention, or the priority is determined using any other appropriate technique as described above. The software package is then tested with the selected test module in step S4. If the software package fails the test in step S4, then control passes via step S5 to step S8 at which point an appropriate error message is output. Alternatively, if the test performed in step S4 is passed by the software package, then control passes via step S5 to step S6. At this point, with reference to the directory 80 or other structure in the framework for identifying the next test module, a test is performed as to see whether the last test module has been selected. If there are still test modules to be executed, then control passes to step S3 and the test module with the next highest priority is selected.

If, however, the last module had already been tested, then control passes from step S6 to step S7 and a message is output indicating that the software package passed all the tests, and accordingly that the software package can be used and or/delivered to a customer.

It will be appreciated that the flow diagram illustrated in FIG. 7 is merely one possible flow organization for implementing an embodiment of the present invention. For example, the initial verification, rather than being performed by the control module, could be provided by a specific test module that always has the highest priority. Also, the initial verification may be quite different if, for example, the software packages do not include a pkgmap file. Moreover, the detail of the control loop in the flow of FIG. 7 could be implemented in different ways. For example, depending on the programming language used, step S6 could effectively be part of step S3. However, it will be noted that individual tests are performed as defined by separate test modules and that the order of operation of the test modules can be selected by according an appropriate priority to each of those tests. By correctly ordering the tests, it is possible to provide efficient verification, whereby one or more fundamental tests may be performed initially, avoiding the need for subsequent tests to be performed if the fundamental test or tests are not passed by the software package. The use of a flexible framework as described enables individual test modules to be added or deleted as appropriate.

In the following, a number of examples of possible examples of test modules 70 for testing different software package parameters will be described. It will be appreciated that these are merely examples of possible test modules, and that other test modules may be envisioned. Also, in any particular embodiment, the specific test modules to be chosen will depend on the requirements of that embodiment. Each of the test modules is, in a particular embodiment of the invention, implemented by a respective script in a scripting language. However the test modules could be configured as objects in an object orientated language, or by any other form of program module in any language as required for a particular application.

One test module 70 can be used to check that a package does not contain any files of zero size. In order to perform this, the test module script performs, an initial check to see if the package is compressed. If the package is compressed, it is decompressed and then a check is made to test whether there are any empty files.

Another further module 70 can check that there are no rubbish files in the package, that is files that were in the package but are not named in the pkgmap file. In this case, the test module script compares each file in the package to the content of the pkgmap file. The package fails this test if any file found is not referenced in the pkgmap file.

A further test module 70 can test that a correct form of a current copyright notice has been included in the file. In this the test module script checks that a file contains the current year as the copyright notice.

A test module 70 can check that only specified software modules are present.

A further test module 70 can be employed where a new package is compared to a previous package to see if any changes have been effected between packages. In this case the test module script compares the packages to see whether there have been any changes between the current and previous versions of the packages, and to see that the pkgmap file correctly reflects this.

A further test module can be provided to test whether a software package to be verified is missing files deleted with respect to an earlier version of that package. In this case, the test module script carries out an appropriate comparison of the current and previous versions of the package.

Another test module can be provided for testing package structure identity, including checking the binary data type, the compiler version that was used to build the binary files, or if the files are sample source code, that they compile clearly against a particular version of the computer. The binary data type check can be to check whether, for example, 32 or 64 bit data are used. If there is a difference, there can be an architectural problem with the construction of the file. In the context of the compiler version check, a check can be made that the files have been generated by an appropriate compiler. If inconsistent compiler versions are identified, an appropriate error message can then be output. Also, if, for example, files are compiled using a particular version of a compiler, then a check can be made to ensure that all files were compiled using the same version of that compiler. These tests could be provided by a single test module script, or could be provided by respective test module scripts in respective test modules.

Thus, for example, a test that all components are compiled using a compatible compiler version could be performed by a separate test module script in a separate test module 70.

It will be appreciated that one or more of the tests could be combined in common test modules, or each of the tests described above could be implemented using a separate test module. It will further be understood that other test modules can be employed for testing any appropriate parameters for confirming the correctness of a software package.

There has been described, a software package verification tool that enables verification of a software package that includes at least one software component. The tool includes a framework operable to identify at least one test module defining a test of at least one parameter of a software component of the package. The tool also includes a control module operable to access the framework to cause at least one test module identified therein to perform the test defined thereby for verifying the package.

The framework, within which individual test modules may be added or deleted as required, provides a flexible test structure for software packages. Typically, the framework identifies a plurality of test modules for verifying the correctness of a particular software package. In such a case, the framework can identify a priority for each test module for effecting an ordering of the tests. This enables the performance of the tests to be efficient, avoiding, for example, unnecessary tests that are redundant if the software package fails a more fundamental test.

The control module, the framework and the test modules can each be implemented by program code, for example by respective scripts in respective software modules. In one embodiment of the invention each test module is formed by a script and the framework identifies a test module by a name for the script for that module. However, in other embodiments, other structures and implementations could be employed. For example, software verification tool and/or the test module logic could be embodied in a special purpose integrated circuit such as an application specific integrated circuit (ASIC).

The software tool could be provided as a computer program product. A computer program product for implementing the invention can be in the form of a computer program on a carrier medium. The carrier medium could be a storage medium, such as solid state magnetic optical, magneto-optical or other storage medium. The carrier medium could be a transmission medium such as broadcast, telephonic, computer network, wired, wireless, electrical, electromagnetic, optical or indeed any other transmission medium.

Examples of tests that may be performed by respective test modules are as follows:
a test of package structure integrity;
a test that all components are compiled using a compatible compiler version;
a test that all binaries are for the same architecture;
a test that a copyright module is current;
a test that only specified modules are present;
a test for changes with respect to a previous version of the package.

Although particular embodiments of the invention have been described, those skilled in the art will know of various changes in form and detail which may be made without departing from the spirit and scope of the present invention as defined in the appended claims and their full scope of equivalents.

For example, tests other than those described herein may be implemented by the test modules. Also, one or more tests could be performed by any one test module, as appropriate for a particular application or group of applications.

What is claimed is:

1. A program storage device readable by a computer, tangibly embodying a program of instructions executable by the computer to perform method steps for verifying the correct installation of a software package that includes at least one installed software component and wherein the software package includes a file list having data entries associated with have information about the at least one software component, the method comprising the steps of:
 a) providing a plurality of test modules configured to compare the data entries from the file list with information about an associated software component of the software package to determine correct installation of the software component;
 b) providing a framework for identifying the test modules, each said test module defining a test that, when executed, compares the data entries from the file list with associated information about an associated installed software component of the software package;
 c) accessing the framework to identify the plurality of test modules;
 d) causing a first test module to compare selected data entries from the file list with associated information about an installed software component of the software package to verify the correctness of the installation of the software component;
 e) determining whether further test modules of the plurality of test modules are to be executed;
 f) where further test modules are to be executed, causing another test module to compare selected data entries from the file list with associated information about another installed software component of the software package to verify the correctness of the installation of the another software component, then returning to operation e);
 g) where no further test modules are to be executed, ending the program.

2. The method of claim 1, wherein a priority for each of the test modules is identified in the framework.

3. The method of claim 1, comprising sequentially causing each of the test modules to be executed according to the priority identified for each of the test modules.

4. The method of claim 1, comprising identifying each of the test modules as being one of active and not active and wherein only active test modules are executed.

5. The method of claim 1, comprising providing a directory in the framework, wherein the directory has a plurality of entries, each entry identifying one of the plurality of test modules.

6. The method of claim 1, wherein the file list that identifies the plurality of software components in the software package comprises a Solaris pkgmap file.

7. The method of claim 6, wherein comparing selected data entries from the file list with associated information about an installed software component of the software package to verify the correctness of the installation of the software component includes comparing the data from the file list with actual file information from the installed software components to determine correctness of at least one of:
 file names for the software components, version numbers for the software components, vendor identification for the software components, copyright information concerning the software components, the size of the software components, the binary data types of the software components.

8. The method of claim 7, wherein comparing selected data entries from the file list with associated information about an installed software component of the software package further comprises comparing the compiler version used with the installed software components with the compiler version in the file list.

9. The method of claim 1, wherein comparing selected data entries from the file list with associated information about an installed software component of the software package further comprises comparing at least one of: copyright information concerning the software installation components, the size of the software components, the binary data types of the software components.

10. The method of claim 1, wherein the providing the framework includes added and deleted test modules from the framework as desired.

11. A method for verifying the correct installation of a software package that includes at least one installed software component and wherein the software package includes a file list installed with the software package, the file list having data entries associated with parameters for the at least one software component, the method comprising the operations of:
 a) providing a plurality of teat modules configured to compare the data entries from the file list with information about an associated software component of the installed software package to determine correct installation of the software component;
 b) providing a framework for identifying a plurality of test modules, each said test module configured to compare file data of a selected one of the installed software components to associated data entries of the installed file list to test the correctness of the software component of the package;
 c) accessing the framework to identify the plurality of test modules;
 d) causing a first test module to compare selected data entries from the file list with associated information about an installed software component of the software package to verify the correctness of the installation of the software component;
 e) determining whether further test modules of the plurality of test modules are to be executed;
 f) where further modules are to be executed, causing another test module to compare selected data entries from the file list with associated information about another installed software component of the software package to verify the correctness of the installation of the another software component, then returning to operation e);
 g) where no further modules are to be executed, ending the program.

12. The method of claim 11, wherein a priority for each of the test modules is identified in the framework.

13. The method of claim 12, comprising sequentially causing each of the test modules to be executed according to the priority identified for each of the test modules.

14. The method of claim 11, comprising identifying each of the test modules as being one of active and not active.

15. The method of claim 11, comprising providing a directory in the framework, wherein the directory has a plurality of entries, each entry identifying one of the test modules.

16. The method of claim 15, wherein identity of a module defines its priority.

17. The method of claim 11, wherein each entry defines a priority of the test module identified thereby.

18. The method of claim 11, wherein the plurality of test modules are configured to test at least one of: that the software components are compiled using the same compiler version; that binary data types of the software components are compatible with the same architecture; that the copyrights are current; and a test whether only specified software components are present in the installation package.

19. The method of claim 18, wherein the plurality of test modules are further configured to include a module for testing whether there have been changes to the software installation package relative to a prior version of the software installation package.

20. The method of claim 18, wherein the plurality of test modules are further configured to include a module for testing whether there are any zero size files in the software installation package.

21. A method of verifying a software package that includes at least one software component, the method comprising the steps of:
   a) providing a computer having installed thereon a software package comprising at least one software component wherein the software package includes an associated file list, the file list having data entries corresponding to actual contents of the flies of the at least one software component;
   b) accessing a framework mounted on the computer that references at least one test module to identify the at least one test module from the framework, each said test module configured to compare selected data entries from the file list with the actual contents of the files of a software component associated with the data entries to verify the correctness of the installation of the software component; and
   c) performing the test by causing the at least one test module to compare selected data entries from the file list with the actual contents of the files of a software component verify the correctness of the installation of the software component.

22. The method of claim 21, including repeating steps (b) and (c) to perform a sequence of tests, the order in which the tests are performed being determined by relative priorities assigned to each of the at least one test module.

23. A method of verifying the correct installation of a software package that includes at least one software component, the method comprising the steps of:
   a) providing a computer having installed thereon a software package wherein the package includes having at least one software component and an associated file list containing data about the flies of the software package;
   b) providing a test framework that includes a control module suitable for referencing at least one test module for conducting verification of software installation packages, the test modules configured to test the software component by comparing data from the file list with actual data from installed files of the software component;
   c) receiving a command to verify installation of the software package;
   d) authenticating the command to verify;
   e) executing a initial verification of the software installation package using a control module, wherein the initial verification is conducted by comparing data from the file list with actual data from installed files of the software component
   f) where the initial verification is successful, selecting a next module from among the at least one test module to conduct verification of the software package; and
   g) executing verification testing of the software package using the next module wherein the verification using the next module is conducted by comparing data from the file list with actual data from installed files of the software component.

24. The method of claim 23 wherein operations f and g e are iteratively performed until all test modules of the at least one test module have been executed.

25. The method of claim 23 wherein if any verification or authentication operations fail an error message is generated.

26. The method of claim 23 wherein executing the authentication of the command to verify installation comprises:
   receiving a verification command; and
   checking that the verification command includes a correct number of arguments.

27. The method of claim 26 wherein executing the authentication of the command to verify installation comprises at least one of:
   confirming that a user of the software installation package has the correct permissions;
   confirming that software components of the software installation package exist in the correct directories;
   confirming that the software components do not include any zero size files;
   confirming that the software components comprise actual data files and not data links; and
   confirming that package map and package information files for the software package exist in the computer environment.

28. The method of claim 23 wherein b) providing a test framework that includes a control module and at least one test module includes adding, deleting, and modifying the at least one test module to provide a flexible test framework.

29. An automated software package verification tool mounted on a computer for verifying a software package that has been installed on the computer, the software package including at least one software component and a file list having data entries that have information about the at least one software component, the tool comprising:
   a plurality of test modules configured to use the data entries of the file list to verify correct installation of the software components of the software package by comparing the data entries from the file list with information about an associated software component of the software package;
   a framework operable to identify the test modules wherein the plurality of test modules of the framework define a series of automatically executable tests; and
   a control module operable to access the framework to cause the at least one test module identified therein to perform a test comparing the data entries from the file list with information about an associated software component of the software package thereby verifying the package.

30. The tool of claim 29 wherein the framework identifies a priority for each of the test modules.

31. The tool of claim 30, wherein the control module is operable to cause the test modules to be executed sequentially according to the priority identified in the framework for each of the test modules.

32. The tool of claim 29, wherein a mechanism is provided for identifying the at lent one test module as being one of active and not active.

33. 6 The tool of claim 32, wherein the mechanism for identifying the at least one test module as being one of active and not active is included in the framework.

34. The tool of claim 32, wherein the mechanism for identifying the at least one test module as being one of active and not active is included in the control module.

35. The tool of claim 29, wherein the framework comprises a test directory having a plurality of entries, each entry identifying one of the plurality of test modules.

36. The tool of claim 35, wherein entry defines a priority for the one of the test modules identified therein.

37. The tool of claim 35, wherein the identity of the one of the test modules defines its priority.

38. The tool of claim 29,
wherein the file list that identifies the plurality of software components in the software package comprises a pkgmap file.

39. The tool of claim 38, wherein the data included in the file list includes parameter information concerning the plurality of software components in the software installation package; and
wherein the plurality of test modules are operable to use the parameter information included in the file list to verify the software package.

40. The tool of claim 39, wherein the parameter information in the file list includes at least one of: file names for the software components, version numbers for the software components, vendor identification for the software components, copyright information concerning the software components, the size of the software components, the binary data types of the software components.

41. The tool of claim 39, wherein the parameter information in the file list includes the compiler version used with the software components.

42. The tool of claim 29 wherein test modules of the framework can be added, deleted, or modified creating a flexible framework.

* * * * *

UNITED STATES PATENT AND TRADEMARK OFFICE
CERTIFICATE OF CORRECTION

PATENT NO. : 7,080,357 B2 Page 1 of 1
APPLICATION NO. : 09/776328
DATED : July 18, 2006
INVENTOR(S) : Foster et al.

It is certified that error appears in the above-identified patent and that said Letters Patent is hereby corrected as shown below:

In the Claims:

In line 8 of claim 11 (column 10, line 18) change "teat modules" to --test modules--.

In line 8 of claim 21 (column 11, line 19) change "flies" to --files--.

In line 7 of claim 23 (column 11, line 44) change "flies" to --files--.

In line 1 of claim 24 (column 12, line 1) change "f and g e" to --f and g--.

In line 2 of claim 32 (column 12, line 57) change "at lent" to --at least--.

In line 1 of claim 33 (column 12, line 59) delete "6".

Signed and Sealed this

Fourth Day of September, 2007

JON W. DUDAS
*Director of the United States Patent and Trademark Office*